No. 875,290. PATENTED DEC. 31, 1907.
G. W. RUGGLES.
DEVICE FOR VENTILATING CARS.
APPLICATION FILED AUG. 10, 1907.
2 SHEETS—SHEET 1.
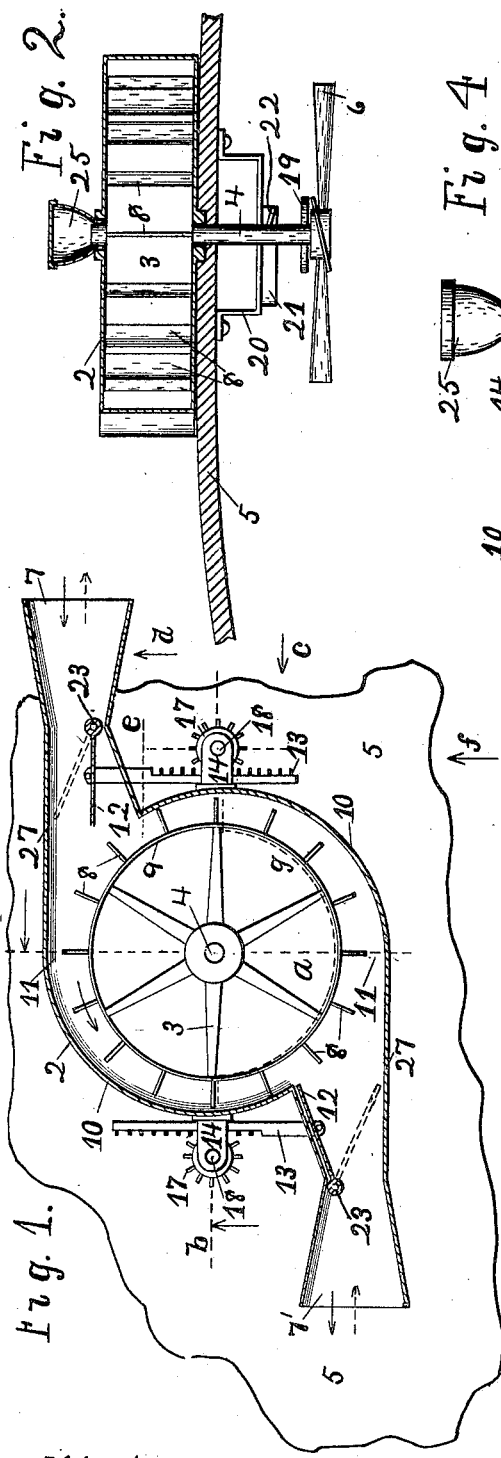
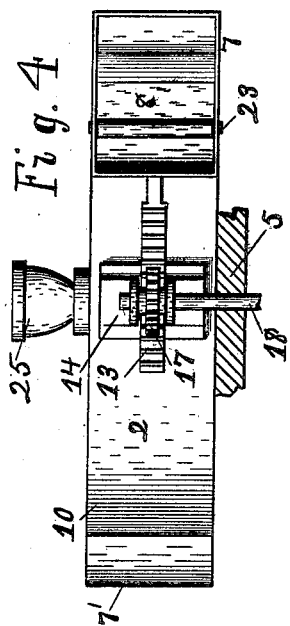
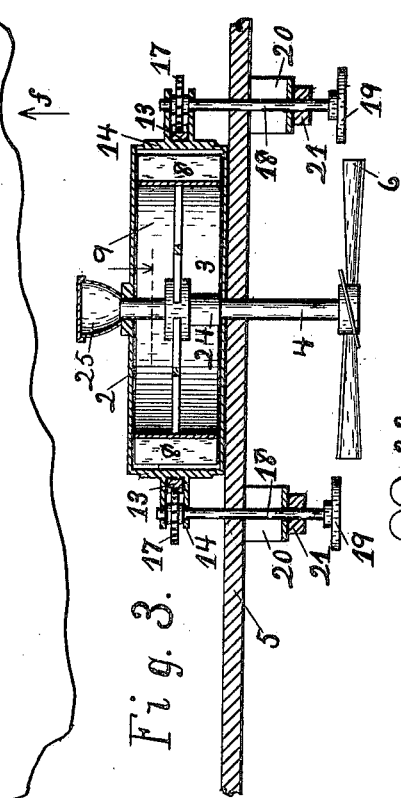
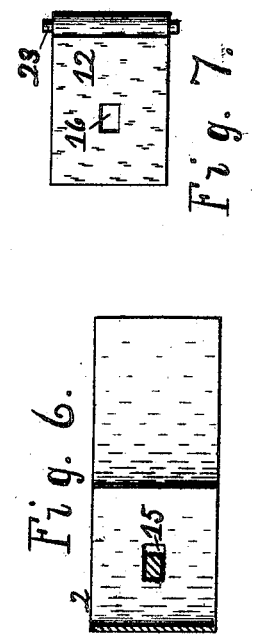
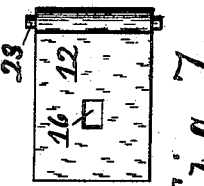
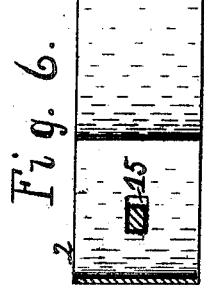
Attest:
A. M. Whitmore,
F. A. Whitmore.
Inventor:
G. W. Ruggles,
by E. B. Whitmore, Atty.

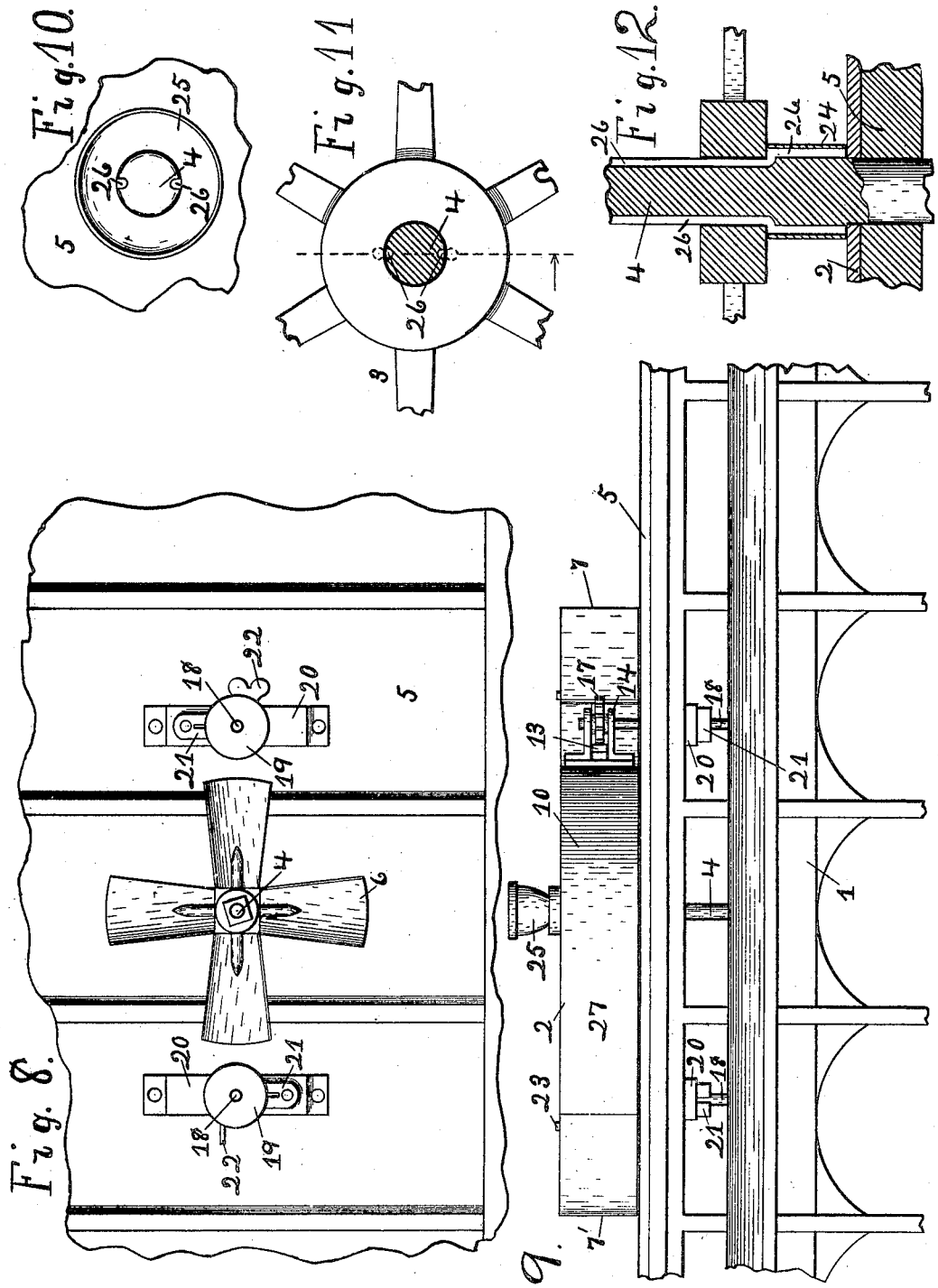

UNITED STATES PATENT OFFICE.

GEORGE W. RUGGLES, OF CHARLOTTE, NEW YORK.

DEVICE FOR VENTILATING CARS.

No. 875,290.  Specification of Letters Patent.  Patented Dec. 31, 1907.

Application filed August 10, 1907. Serial No. 388,042.

*To all whom it may concern:*

Be it known that I, GEORGE W. RUGGLES, of Charlotte, in the county of Monroe and State of New York, have invented a new and useful Improvement in Devices for Ventilating Cars, which improvement is fully set forth in the following specification and shown in the accompanying drawings.

My invention is an apparatus, comprising one or more revolving fans, for moving and agitating the air within passenger coaches, as railway cars and other similar vehicles, for the comfort of the passengers, the fan or fans being operated by the force of the external air encountered by the moving train.

One object, among others, in producing this invention is to materially simplify and cheapen the construction of means for automatically moving the air within a car. This apparatus comprises an incased horizontal wheel over the roof of the car the casing having opposite openings turned in directions longitudinal of the car, for the entrance and the escape of the air encountered and passing through the casing as the car moves in either direction, means being provided for controlling the intake of air for the purpose of regulating the rate of the turning of the wheel.

Means are also provided for using the air that enters the casing to the best advantage in turning the wheel, and for lubricating the bearings of moving parts.

The shaft of the wheel pierces the roof of the car, and it is provided at its lower end, within the car, with a fan to act against the internal air of the car.

Other objects and advantages of the invention will be brought out and made to appear in the following description, and the novel features particularly pointed out in the appended claims, reference being had to the accompanying drawings which, with the reference characters marked thereon, form a part of this specification.

Figure 1 is a plan of the casing with the wheel and associated parts, the upper plate or cover of the casing being omitted. Fig. 2 is a central vertical section of the casing and part of the car, taken on the dotted line *a* in Fig. 1. Fig. 3 is a central longitudinal section of the casing and other parts on the dotted line *b* in Fig. 1, parts of the wheel being vertically sectioned on the curved dotted line *g*. Fig. 4 is an end elevation of the casing and associated parts, seen as indicated by arrow *c* in Fig. 1. Fig. 5 is a view of a hanger for a pinion shaft, and associated parts, looking upward from beneath, the shaft being horizontally sectioned. Fig. 6 is an elevation of a part of the wall of the casing at one end, seen as indicated by arrow *d* in Fig. 1 the vertical section being on the dotted line *e*. Fig. 7 is an elevation of a controlling gate, detached. Fig. 8 is a view of parts within the car looking upward from beneath. Fig. 9 is a side elevation of the casing and adjacent portion of a car, seen as indicated by arrow *f* in Fig. 1. Fig. 10 is a plan of the lubricating cup uncovered, showing the end of the wheel shaft. Fig. 11 is a plan of the hub and parts of the wheel, showing the oil ducts, the shaft being transversely sectioned as on the dotted line in Fig. 3. Fig. 12 is a vertical section of parts through the axis of the wheel and shaft, further showing the oil passages to the bearing of the shaft. Figs. 4, 5, 6, 7, 10, 11 and 12 are drawn to scales larger than that of the remaining figures.

Referring to the parts shown 1, Fig. 9, is a portion of the upper part of a car upon the roof 5 of which is mounted a metal casing 2, Figs. 1, 2, 3, 4 and 9, inclosing a driving wheel 3. This wheel is carried by a vertical shaft 4, Figs. 1, 2, 3 and 8 to 12, piercing the roof 5 of the car and carrying at its lower end within the car a fan 6. The casing 2 is formed alike at both ends, having similar flaring mouths or openings 7 7' turned or facing in opposite directions, and being mounted longitudinally upon the car with the openings facing toward the respective ends of the car.

The wheel 3 is formed with peripheral buckets 8, Figs. 1 and 2, preferably disposed radially upon the band or body 9 of the wheel, as shown; and, if the car be moving in direction toward the right, regarding Fig. 1, the air entering the mouth or opening 7, as indicated by the full-line arrow, will impinge against the buckets 8 in its path and turn the wheel as indicated by the curved arrow and finally pass out at the opening 7', as indicated. Or, if the car be moving in the opposite direction the encountered air will pass in at the mouth or opening 7', indicated by the dotted arrow, and out at the mouth 7, the wheel always being turned by the air in the same direction.

It will be observed that the opposing vertical side walls of the casing 2 are each composed of a straight part 27 and a circular part 10 the straight parts being parallel and longitudinal of the car and the curved parts concave toward each other with the wheel 3 between, said curved portions 10 being eccentric with each other and with the wheel. This relative arrangement of the curved parts 10 10 and the wheel serves to leave wide spaces 11 11 at the edges of the buckets 8 primarily encountered by the inflowing air, these spaces decreasing toward the terminals of the curved parts 10 and the buckets passing said terminals having their outer edges just clearing the inner surfaces of the curved walls 10. This permits of portions of the inflowing air to pass the edges of the buckets first encountered and so strike with force the buckets further on, thus using the moving air to the best advantage for turning the wheel.

Gates 12, Figs. 1 and 7, are employed to control the amount of air flowing into either mouth of the casing, for the purpose of regulating the velocity of the wheel, the gates turning on vertical pintles 23 held by the casing. These gates are operated by means of horizontal toothed racks 13 moving in guides or rests 14, Figs. 1, 3, 4 and 9, secured to the curved parts of the casing 2, the racks entering the casing through openings 15, Fig. 6, and piercing the gates 12, at 16, Fig. 7, and being movably attached thereto. The racks are moved longitudinally by pinions 17 held between branches of the rests 14, the pinions being carried by vertical spindles or shafts 18, Figs. 1, 3, 4, 8 and 9, piercing the roof 5 of the car and having knurled ears or thumb-pieces 19 for turning them.

The shafts 18 pass through hangers 20 pending from the roof of the car, and holding split clamps 21, best shown in Fig. 5, pierced by the spindles, clamp-screws 22 being provided for tightening the clamps onto the spindles. By these means the gates 12 may be shifted and set in any positions desired, turning on the pintles 23 rigid in the upper plate and the floor of the casing.

In using this apparatus the gate 12 of the discharge opening of the casing is fixed wholly open, as appears at the left in Fig. 1, the gate at the intake opening being set to regulate the amount of air passing into the casing in any given case.

The shaft 4 holding the wheel 3 is formed with an enlarged part 24, Figs. 3 and 12, below the hub of the wheel, resting at its lower end upon a suitable bearing on the floor or bottom plate of the casing, which bearing may be provided with balls or other antifriction devices in common use. On the upper side of the casing 2 is provided an oil cup or reservoir 25, Figs. 2, 3, 4, 9 and 10, for holding saturated fiber as cotton waste, ducts or passages 26, Figs. 10, 11 and 12, being formed in the shaft to conduct the oil to the bearing of the shaft at the floor of the casing.

What I claim as my invention and desire to secure by Letters Patent is:—

1. A device for ventilating cars, comprising a casing on the car having air passages at opposite ends and its opposing side-walls having curved portions concave toward each other, and a wheel between and eccentric with said curved portions, a shaft for the wheel extending into the interior of the car, a fan on the shaft, and means within the said air passages for controlling the amount of air acting against the wheel and independent means for actuating the means at each end independently of the other, 2. A device such as described, consisting of a casing without the car having air openings, a wheel in the casing, a shaft for the wheel extending from without to within the car, a fan on the shaft within the car, pivotal gates for controlling the flow of air within the casing, toothed racks connected movably with the gates, guides on the casing for the racks, toothed pinions in the guides to engage the racks, and means within the car for turning the pinions.

In witness whereof, I have hereunto set my hand this 8th day of August, 1907, in the presence of two subscribing witnesses.

GEORGE W. RUGGLES.

Witnesses:
E. B. WHITMORE,
A. M. WHITMORE.